Dec. 1, 1936. H. Y. SWANK ET AL 2,062,948
METHOD AND MEANS FOR SEPARATING AND RETARDING RELATIVE MOVEMENT OF
REFRACTORY, VITRIFIED, AND LIKE PRODUCTS DURING TRANSPORTATION
Filed Oct. 23, 1933
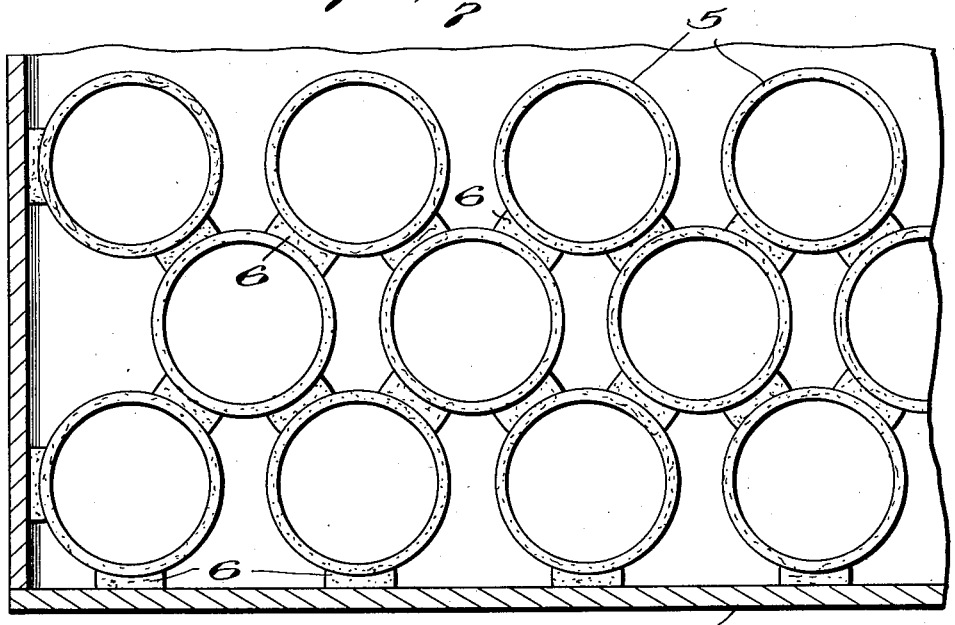
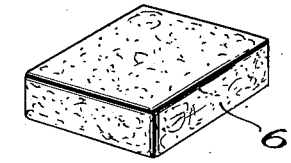
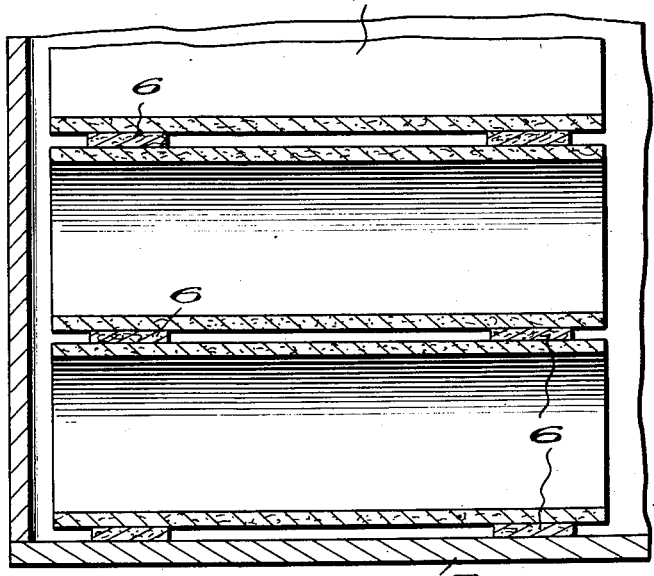
Inventors
Helen Young Swank,
&
Albert M. Swank.
By Bernard J. Garvey
Attorney Patented Dec. 1, 1936

2,062,948

UNITED STATES PATENT OFFICE 2,062,948

METHOD AND MEANS FOR SEPARATING AND RETARDING RELATIVE MOVEMENT OF REFRACTORY, VITRIFIED, AND LIKE PRODUCTS DURING TRANSPORTATION

Helen Young Swank and Albert M. Swank, Johnstown, Pa.

Application October 23, 1933, Serial No. 694,854

4 Claims. (Cl. 105—369)

Our invention consists in a method and means for separating and retarding relative movement of refractory, vitrified and like products, especially hollow clay products, during transportation.

In transporting hollow clay products, such as conduits, pipes, hot tops for ingot molds, hollow building tile, and the like, the loss sustained by fracture and breakage is very great, due to the low shear or tension value of clay products. This loss has been so great that railroads have adopted standard keys for the guidance of shippers in the transportation of commodities of this character. This has lessened the amount of breakage in transportation, but the loss ratio per car still runs between sixteen to fifty percent, with the resultant loss of hundreds of thousands of dollars annually to railroads. We have found that the present invention practically eliminates fracture and breakage of devices of this character in transportation and entails no more expense than now required to load in accordance with the keys made standard by the railroads.

The present invention has for an object to utilize the basic homogenous mass from which refractory, vitrified, ceramic, and like products are made; this last is known in the art as "mud", and in the present invention is used to space the products from the bottom of the transporting carrier as well as from one another; the spacing is effected during the loading operation and we have found that the "mud" is of sufficient plasticity to effect adhesion and prevent relative movement of the products or elements being transported.

A further object of the invention is to extrude the "mud" in bars or strips, relatively small in cross-section, which are subjected to a bath in a chemical solution of high surface tension to provide a non-cracking surface film which prevents disintegration of the bars or strips.

Other objects of the invention will be manifest from the following description of the present preferred form of the invention taken in connection with the accompanying drawing, wherein Fig. 1 is a fragmentary, cross-sectional view of a transporting carrier, showing hollow clay products mounted therein, arranged in spaced relation in accordance with the teaching of the present invention.

Fig. 2 is a vertical, sectional view of the same; and

Fig. 3 is a perspective view of one of the spacing blocks forming a part of the present invention.

To illustrate one method of carrying out the present invention, we have in the drawing, shown a transporting carrier 4, which may be a railroad car, and has a plurality of hollow, clay products 5, mounted therein, which in the present instance, are shown to be cylindrical pipes. The pipes are loaded in spaced relation to the bottom and sides of the carrier through the medium of blocks or pads 6, these being arranged at intervals between the bottom row of pipes and the sides of the carrier, as shown to advantage in Figs. 1 and 2.

We have found that a preferred method of loading products of this character in accordance with the teaching of the present invention is to superimpose the pipe or other object being transported, on two or more of the blocks 6, which are deposited on the floor of the car, or other carrier. Preferably, a block will lie adjacent each end of each pipe, and the latter are spaced from one another, similar to the showing in Fig. 1. The next row of pipes or the like, is then arranged in superposed relation to the lower row, but spaced therefrom by the blocks 6. These blocks are mounted so as to impinge the pipes at two points to hold the pipes suspended above the lower row of pipes, in order that the longitudinal axis of the first said pipes will parallel a line drawn between the subjacent lower pipes upon which they are mounted. In this way, all relative movement of the pipes or other products being transported, is eliminated.

The blocks 6 are formed by running the "mud", used to make up the pipes or other products, through an extruding machine from which the "mud" issues in bars or strips, after which it is subjected to a chemical bath. We have found that a non-penetrating solution of high surface tension is best for this purpose to provide the bars or strips with a film which positively adheres to the surface, thereby preventing disintegration of the bars. The bars or strips are cut in any desired length to form the blocks 6. It is of course to be understood that the block 6 may be used for short hauls without any chemical treatment, there being sufficient inherent moisture in the block to keep it plastic for many hours. For long hauls it is desired, however, to treat the extruded "mud" in the manner above set out. To keep the blocks from freezing in cold weather we include in the chemical bath a chlorine or the like. We have found in actual use that the blocks will remain plastic for many days after having been subjected to a chemical bath as herein set forth.

Since the "mud" used to make up hollow clay products, is characterized by plasticity, it is manifest that the blocks 6 will adhere to the surfaces of the products being transported. Additionally, the weight of these products is sufficient to form seats in the blocks, so the latter will in effect, conform to the contour of the products being shipped. Consequently, an adhesion is effected throughout both the top and bottom faces of each block. The blocks need not be of any predetermined size or shape. We have found that the "mud" can be extruded in round bars which are cut into the desired lengths and serve the same purpose as the blocks shown in the drawing. Under pressure of the load, the bars conform to the shape of the product, regardless of configuration. It is however, desirable to have each block or bar of sufficient length to extend an appreciable distance on each side of the axis of the product being shipped, to avoid possibility of displacement of the product from the block or bar during transportation.

While we have herein shown a preferred method and means of using the invention, it is nevertheless to be understood that departure may be made therefrom within the scope of the claims, hereto appended. We have found however, that when hollow clay products are transported in accordance with the teaching of our invention, the products are held from relative movement and fracture and breakage thereof is negligible, being less than one percent. The plasticity of the "mud" effects the adhesion and the "mud" extruded as called for in the present invention, is of sufficient density to provide a cushion or saddle for the products. Additionally, loading of a car is facilitated in use of the present invention, since the blocks 6 will adhere to the products when placed thereon with little danger of slippage, while the next row of the products is being loaded.

What is claimed is:

1. Means for use in spacing hollow, clay products for transportation, comprising "mud" deposits engageable between the products, and between the products and the transporting carrier.

2. In combination with a transporting carrier for hollow, clay elements arranged in superposed relation in the carrier; and means mounted at intervals, between the elements and between the elements and the carrier, said means being yieldable to conform to the shape of the elements and characterized by plasticity to adhere to the elements.

3. A method of loading hollow clay products for transportation consisting in spacing the products by spacing means from the transporting carrier and from one another, and effecting an adhesion of the products to one another and to the transporting carrier through said spacing means.

4. Means for use in spacing hollow clay products for transportation including independent blocks positioned at intervals between the products and the transporting carrier, the blocks being pliable to spread under the load of the products and snugly engage the latter throughout the extent of the blocks.

HELEN YOUNG SWANK.
ALBERT M. SWANK.